United States Patent
Chikura et al.

(10) Patent No.: US 8,361,318 B2
(45) Date of Patent: Jan. 29, 2013

(54) SPIRAL TYPE SEPARATION MEMBRANE ELEMENT

(75) Inventors: Shinichi Chikura, Ibaraki (JP); Satoru Ishihara, Ibaraki (JP); Mitsuaki Hirokawa, Ibaraki (JP); Yasuhiro Uda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 622 days.

(21) Appl. No.: 12/642,653

(22) Filed: Dec. 18, 2009

(65) Prior Publication Data

US 2010/0096316 A1 Apr. 22, 2010

Related U.S. Application Data

(63) Continuation of application No. 10/593,760, filed as application No. PCT/JP2005/004919 on Mar. 18, 2005, now abandoned.

(30) Foreign Application Priority Data

Mar. 26, 2004 (JP) .................................. 2004-092415

(51) Int. Cl.
*B01D 63/10* (2006.01)
*B01D 63/12* (2006.01)

(52) U.S. Cl. ......... 210/321.83; 210/321.85; 210/321.76; 210/321.74; 210/493.4

(58) Field of Classification Search ........................ None
See application file for complete search history.

(56) References Cited

U.S. PATENT DOCUMENTS

| | | | |
|---|---|---|---|
| 3,386,876 A | 6/1968 | Wyckoff | |
| 4,022,692 A | 5/1977 | Janneck | |
| 4,213,858 A | 7/1980 | Boberg et al. | |
| 4,225,438 A * | 9/1980 | Miller et al. | 210/321.74 |
| 4,902,417 A | 2/1990 | Lien | |
| 5,073,263 A | 12/1991 | Fagundes et al. | |
| 5,114,582 A | 5/1992 | Sandstrom et al. | |
| 5,128,037 A | 7/1992 | Pearl et al. | |
| 5,562,827 A | 10/1996 | Schmidt et al. | |
| 6,106,715 A | 8/2000 | Thalmann et al. | |
| 6,224,767 B1 | 5/2001 | Fujiwara et al. | |
| 6,565,747 B1 | 5/2003 | Shintani et al. | |
| 6,881,336 B2 | 4/2005 | Johnson | |

(Continued)

FOREIGN PATENT DOCUMENTS

| | | |
|---|---|---|
| CN | 1170618 | 10/2005 |
| EP | 0 478 111 | 4/1992 |

(Continued)

OTHER PUBLICATIONS

Da Costa et al., "Net-type spacers: Effect of configuration on fluid flow path and ultrafiltration flux." *Ind. Eng. Chem. Res.*, vol. 33, 1994: 1845-1851.

(Continued)

*Primary Examiner* — Krishnan S Menon
(74) *Attorney, Agent, or Firm* — Knobbe Martens Olson & Bear LLP

(57) ABSTRACT

An object of the invention is to provide a spiral separation membrane element that can reduce the pressure loss of a feed-side channel and be much less vulnerable to the problem of inhibition or blockage of the flow in the feed-side channel. The spiral separation membrane element includes one or more separation membranes, one or more feed-side channel components, one or more permeation-side channel components, and a perforated hollow core tube around which the separation membranes, the feed-side channel components and the permeation-side channel components are wrapped, wherein the feed-side channel component is a net formed by fusion bonding.

12 Claims, 6 Drawing Sheets

U.S. PATENT DOCUMENTS

| | | | |
|---|---|---|---|
| 7,326,659 | B2 | 2/2008 | Cederblad et al. |
| 7,326,660 | B2 | 2/2008 | Walraevens et al. |
| 2003/0205520 | A1 | 11/2003 | Johnson |
| 2004/0182774 | A1 | 9/2004 | Hirokawa et al. |
| 2005/0077229 | A1 | 4/2005 | Ishii |
| 2005/0194317 | A1 | 9/2005 | Ikeyama et al. |
| 2007/0062857 | A1 | 3/2007 | Popa et al. |
| 2007/0175812 | A1 | 8/2007 | Chikura et al. |
| 2007/0196185 | A1 | 8/2007 | Kohel et al. |
| 2007/0199654 | A1 | 8/2007 | Kohel et al. |
| 2008/0190836 | A1 | 8/2008 | Beppu et al. |
| 2009/0026130 | A1 | 1/2009 | Chikura et al. |
| 2009/0065426 | A1 | 3/2009 | Ishii et al. |
| 2010/0108593 | A1 | 5/2010 | Chikura et al. |

FOREIGN PATENT DOCUMENTS

| | | |
|---|---|---|
| EP | 0 508 646 | 10/1992 |
| GB | 2164871 A | 4/1986 |
| JP | 53-124179 | 10/1978 |
| JP | 62-27701 | 2/1987 |
| JP | 64-003444 | 1/1989 |
| JP | 4-018921 | 1/1992 |
| JP | 4-326926 | 11/1992 |
| JP | 05-123545 | 5/1993 |
| JP | 5-168869 | 7/1993 |
| JP | 06-007649 | 1/1994 |
| JP | 10-137558 | 5/1998 |
| JP | 10-156152 | 6/1998 |
| JP | 10-230140 | 9/1998 |
| JP | 10-230145 | 9/1998 |
| JP | 10-309445 | 11/1998 |
| JP | 11-235520 | 8/1999 |
| JP | 2000-000437 | 1/2000 |
| JP | 2000-042378 | 2/2000 |
| JP | 2000-153270 | 6/2000 |
| JP | 2000-354742 | 12/2000 |
| JP | 2001-017840 | 1/2001 |
| JP | 2001-300271 | 10/2001 |
| JP | 2004-050005 | 2/2004 |
| JP | 2004-089763 | 3/2004 |
| JP | 2004-283708 | 10/2004 |
| JP | 2005-103516 | 4/2005 |
| JP | 2005-178010 | 7/2005 |
| JP | 2005-279377 | 10/2005 |
| JP | 2006-507919 | 3/2006 |
| JP | 2007-531616 | 11/2007 |
| JP | 2009-233629 | 10/2009 |
| WO | WO 03/092872 A1 | 11/2003 |
| WO | WO 2004/009222 A1 | 1/2004 |
| WO | WO 2005/097305 A1 | 10/2005 |

OTHER PUBLICATIONS

International Preliminary Report on Patentability issued on the corresponding PCT Application No. PCT/JP2005/004919, dated Apr. 26, 2005.

International Preliminary Report on Patentability issued on the related PCT Application No. PCT/JP2006/321371, dated May 6, 2008.

International Search Report issued on the corresponding PCT Application No. PCT/JP2005/004919, dated Apr. 26, 2005.

International Search Report issued on the related PCT Application No. PCT/JP2006/321371, dated Dec. 26, 2006.

International Search Report issued on the related PCT Application No. PCT/JP2007/054466, dated Jun. 12, 2007.

International Search Report issued on the related PCT Application No. PCT/JP2007/054637, dated Jun. 12, 2007.

Microfilm of the specification and drawings annexed to the request of Japanese Utility Model Application No. 025197/1981 (Laid-open No. 140803/1982).

Song et al., "Numerical studies of the impact of spacer geometry on concentration polarization in spiral wound membrane modules." *Ind. Eng. Chem. Res.*, vol. 44, 2005: 7638-7645.

File History of the related U.S. Appl. No. 11/722,659, for the period of May 8, 2009-Dec. 14, 2009.

File History of the related U.S. Appl. No. 12/137,317, as of May 7, 2009.

File History of the related U.S. Appl. No. 12/282,138, as of May 7, 2009.

File History of the related U.S. Appl. No. 12/282,550, as of May 7, 2009.

Japanese Office Action issued on the corresponding Japanese Patent Application No. 2005-076770, dated Mar. 2, 2010.

File History of the related U.S. Appl. No. 11/722,659, for the period of Dec. 15, 2009-Jan. 19, 2011.

File History of the related U.S. Appl. No. 12/137,317, for the period of May 8, 2009-Jan. 19, 2011.

File History of the related U.S. Appl. No. 12/282,138, for the period of May 8, 2009-Jan. 19, 2011.

File History of the related U.S. Appl. No. 12/282,550, for the period of May 8, 2009-Jan. 19, 2011.

File History of the related U.S. Appl. No. 12/642,400, as of Jan. 19, 2011.

Wang, Jianqing, Packaging Material, National Defense Industry Press, Jun. 2004.

* cited by examiner

DIRECTION OF FEED FLUID FLOW

DIRECTION OF FEED FLUID FLOW

DIRECTION OF FEED FLUID FLOW

DIRECTION OF FEED FLUID FLOW

DIRECTION OF FEED FLUID FLOW

ΔP (COMAPARISON AT AVERAGE FLOW RATE v=0.2m/s)

DIRECTION OF FEED FLUID FLOW

SPIRAL TYPE SEPARATION MEMBRANE ELEMENT

CROSS-REFERENCE TO RELATED APPLICATIONS

The present application is a continuation of U.S. patent application Ser. No. 10/593,760, filed Sep. 22, 2006, which is the U.S. National Phase under 35 U.S.C. §371 of International Application No. PCT/JP2005/004919, filed Mar. 18, 2005, which claims priority to the Japanese Patent Application No. 2004-092415, filed Mar. 26, 2004, and the disclosures of which are herein incorporated by reference in their entireties.

TECHNICAL FIELD

The invention relates to a spiral separation membrane element for separating components dissolved in liquid materials. More specifically, the invention relates to a spiral separation membrane element that can reduce the pressure loss of the feed side in contrast to conventional membrane elements and includes a feed-side channel component whose structure has a stirring effect for suppression of concentration polarization on the membrane surface.

BACKGROUND ART

Some conventional spiral separation membrane elements are known to have a structure in which one or more separation membranes, one or more feed-side channel components and one or more permeation-side channel components are wrapped around a perforated hollow core tube. In the case of a reverse osmosis membrane, it has been reported that if a rhombic type net channel component is used as a feed-side channel component, the pressure loss can be reduced (for example, see Japanese Patent Application Laid-Open (JP-A) No. H11 (1999)-235520, JP-A No. 2000-000437 and JP-A No. 2000-042378 below). For example, such a structure is as shown in FIG. 11.

In order to reduce the pressure loss of a feed-side channel, a ladder-type net channel component is also employed that is composed of warp yarns parallel to the direction of feed fluid flow and weft yarns interlaced with the warp yarns (for example, see JP-A No. 1-105 (1993)-168869 below). This publication pays no attention to the relationship between the thicknesses or diameters of the warp and the well or the relationship between the warp spacing and the well spacing or discloses nothing about the thickness of the warp or the weft.

In the feed-side channel, however, the resistance to feed water flow significantly depends on the feed-side channel component, and the nature of feed water or components contained in feed water can be a cause of an increase in the resistance depending on the quality of feed water.

In the conventional ladder type net, the weft and the warp are generally the same in diameter, the weft can inhibit the flow of feed fluid, and suspended components can cause blockage of the channel. In the rhombic type net with no differentiation between warp and weft, the yarns in two intersecting directions cross the flow channel so that the same problem can occur. Namely, there is a problem in which components suspended in feed fluid can get snagged on the weft of the feed-side channel component to increase the flow resistance or block the flow, though the feed-side flow channel component is required to have not only the function of making the feed-side pressure loss as small as possible but also the function of facilitating surface regeneration on the membrane surface and suppressing concentration polarization. There is also another problem in which the effective membrane area can be reduced because components suspended in feed fluid can get snagged on the weft of the feed-side channel component and be deposited on the membrane surface. An additional challenge is to reduce the pressure loss of the feed-side channel component for the purpose of reducing the running cost of separation membrane elements.

In many cases, conventional nets are formed by a shear method such that fusion bonding between the warp and the weft can be ensured. The shear method uses dies having a number of nozzle holes that are arranged at two circumferential portions (inner and outer portions) in an extruder such that when warp and weft yarns are extruded from the inner and outer nozzle holes being rotated in opposite directions so as to be fused to each other at intersections, both nozzle holes overlap one another to form a single nozzle hole at the intersection of the warp and weft yarns. In the shear method, the amount of extruded resin becomes high at the intersections of the warp and weft yarns so that these portions are deformed into a web-like form. As a result of investigations, the inventors have found that the web-like form causes an increase in the pressure loss of the feed-side channel.

DISCLOSURE OF INVENTION

Problems to be Solved by the Invention

It is therefore an object of the invention to provide a spiral separation membrane element which can reduce the pressure loss of the feed-side channel and be much less vulnerable to the problem of the inhibition or blockage of the flow in the feed-side channel.

Means for Solving the Problems

As a result of making active investigations, the inventors have found that the spiral separation membrane element as described below can achieve the above object and have completed the invention.

The invention is directed to a spiral separation membrane element, including one or more separation membranes, one or more feed-side channel components, one or more permeation-side channel components, and a perforated hollow core tube around which the separation membranes, the feed-side channel components and the permeation-side channel components are wrapped, wherein the feed-side channel component is a net formed by fusion bonding. In this element, the net formed by fusion bonding has a structure in which constituent yarns of the net are fused and bonded to each other to form intersections, and the fused and bonded portions do not protrude from the constituent yarns in a plane form (a projection figure).

The inventors have found that the web-like deformation of intersections is significantly less in net products formed by a fusion bonding method than in those formed by the shear method and that the net products formed by the fusion bonding method can reduce the pressure loss of the feed-side channel and is effective in preventing inhibition or blockage of the flow in the feed-side channel and thus can form excellent spiral separation membrane elements.

Advantageously, the products formed by the fusion bonding method have a relatively smooth surface as compared to the surface of the products formed by the shear method so that damage to the membrane by contact with or wrapping and pressing onto the membrane surface can be lessened in the process of assembling the element, and thus they are very useful for the production of spiral separation membrane elements.

In the feed-side channel component according to the invention, weft yarns crossing the direction of feed fluid flow are preferably thinner than warp yarns arranged along the direction of feed fluid flow. The net products with thinner weft yarns crossing the direction of feed fluid flow can provide a larger cross-sectional channel area for feed fluid and thus are effective against inhibition or blockage of the flow in the feed-side channel and can reduce the pressure loss of the channel.

The feed-side channel component is preferably a net channel component having a structure in which the warp yarns arranged along the direction of feed fluid flow are meandering. It is known that generating turbulent fluid flow in a channel is effective in preventing the inhibition or blockage of the flow in the channel (turbulence effect). According to the invention, it has been found that the structure with warp yarns meandering in the channel component can produce a larger turbulence effect than the conventional channel component such as the ladder type or the rhombic type, and thus there can be provided excellent spiral separation membrane elements with less pressure loss of the feed-side channel.

The feed-side channel component preferably has a two-layer structure including a first layer composed of first yarns and a second layer composed of second yarns, in which the first and second yarns each have a parallel part repeated and arranged substantially parallel to the direction of feed fluid flow and an oblique part repeated and arranged in a direction oblique to the direction of feed fluid flow, and the parallel part of the first yarn and the parallel part of the second yarn are fused and bonded to form a hexagonal plane unit.

In this feed-side channel component, the first and second yarns are overlapping and fused and bonded to each other at the parallel part, so that this part can be less resistant to feed fluid, and the hexagonal plane unit can reduce the number of the intersections per unit flow length (the number of the parallel parts in this case) so that the pressure loss of the feed-side channel can be further reduced.

Alternatively, the feed-side channel component preferably has a three-layer structure including warp yarns arranged substantially parallel to the direction of feed fluid flow, oblique yarns arranged in a direction oblique to the direction of feed fluid flow, and reverse oblique yarns arranged in a direction that is reversely oblique to the direction of feed fluid flow with respect to the direction of the oblique yarns.

In such a feed-side channel component, the layer composed of the warp yarns can be less resistant to feed fluid, and the part composed of the reverse oblique yarns and oblique yarns (thinner than those in the case of the two-layer structure) crossing the direction of feed fluid flow can also be less resistant to feed fluid, so that the pressure loss of the feed-side channel can be further reduced.

Effects of the Invention

As described above, the fusion bonding method is used to form the net for use in the spiral separation membrane element according to the invention so that there is provided an advantage in that the pressure loss of the feed-side channel can be reduced and the inhibition or blockage of the flow can be prevented in the feed-side channel. There is also provided an advantage in that workability can be high in the process of assembling the element or other processes.

In addition, if thinner weft yarns are used which cross the direction of feed fluid flow, if any one-directional set of yarns are thinner than the other directional set of yarns in the rhombic type net channel component, or if the ladder type net channel component has a structure with meandering warp yarns, the pressure loss of the feed-side channel can be further reduced, or the inhibition or blockage of the flow can be effectively prevented in the feed-side channel.

| Description of the Numerals | |
|---|---|
| 1 | Warp yarns |
| 2 | Weft yarns |
| 3 | Thickness |
| 4 | Warp spacing |
| 5 | Weft spacing |
| 6 | Crossing angle |
| 7 | Meandering warp angle |
| 11 | First yarns |
| 11a | Parallel part of the first yarn |
| 11b | Oblique part of the first yarn |
| 12 | Second yarns |
| 12a | Parallel part of the second yarn |
| 12b | Oblique part of the second yarn |
| 15 | Oblique yarns |
| 16 | Warp yarns |
| 17 | Reverse oblique yarns |

BEST MODE FOR CARRYING OUT THE INVENTION

Figure 1:
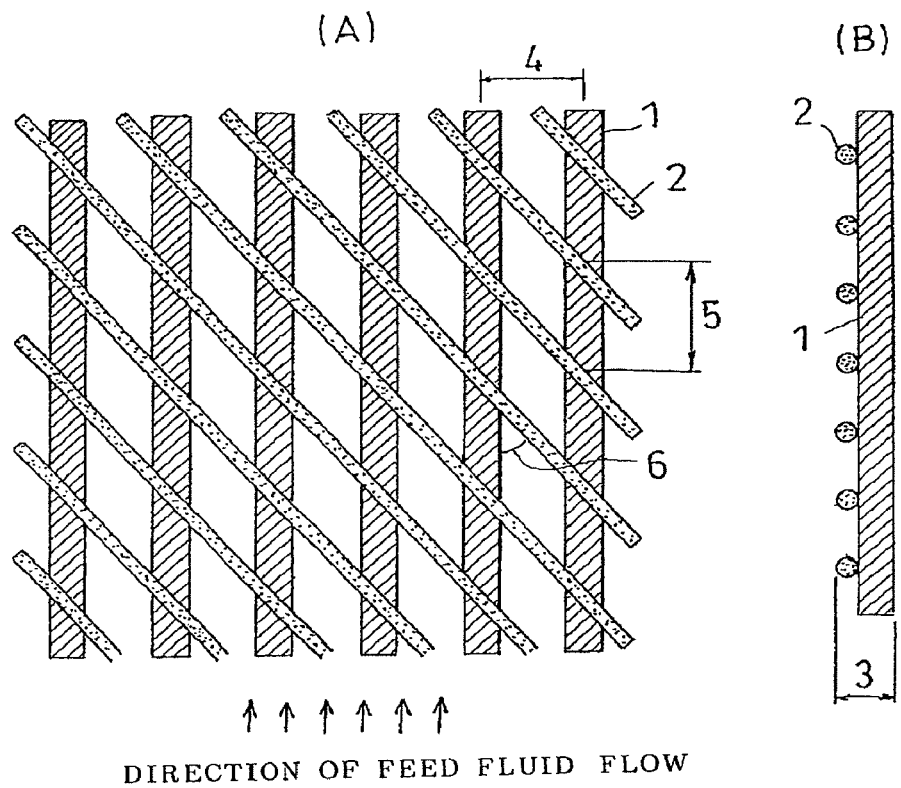
FIG. 1 is a schematic diagram showing a net type according to an embodiment of the invention (first structural example)

Some embodiments of the invention will be described below with reference to the drawings. In FIG. 1, Parts (A) and (B) are front and side views, respectively, showing an example of the feed-side channel component of the spiral separation membrane element according to the invention.

The spiral separation membrane element of the invention has a structure in which one or more separation membranes, one or more feed-side channel components and one or more permeation-side channel components are wrapped around a perforated hollow core tube. Such a structure of a membrane element is also described in detail in Patent Japanese Patent Application Laid-Open (JP-A) No. H11 (1999)-235520, JP-A No. 2000-000437, JP-A No. 2000-042378 and JP-A No. H05 (1993)-168869 above, and except for the feed-side channel component, the separation membrane, permeation-side channel component or perforated hollow core tube may be any conventionally known one. For example, in a case where a plurality of feed-side channel components and a plurality of permeation-side channel components are used, the structure includes a plurality of membrane leaves wrapped around the hollow core tube.

Referring to FIG. 1, for example, the feed-side channel component for use in the invention is a ladder type net channel component having warp yarns 1 and weft yarns 2 with respect to the direction of feed fluid flow as shown in the drawing. The invention is characterized in that the feed-side channel component is a net formed by a fusion bonding method.

The fusion bonding method for forming the net generally includes the steps of extruding weft and warp yarns from a number of nozzle holes arranged at two circumferential portions (inner and outer portions) of dies in an extruder while rotating the inner and outer nozzle holes in opposite directions, fusing and bonding the well and warp yarns to each other to form intersections, dipping them into a cooling bath, and then taking out them. In the process of performing the extrusion, the nozzle holes are arranged such that both nozzle holes do not overlap one another at the intersections of the well and warp yarns (this feature differs from the shear method), and the extruded well and warp yarns are fused and bonded to each other with appropriate timing of fusion bonding.

As compared with the shear method, therefore, the shapes of the well and warp yarns can easily be maintained at the intersections with no increase in the amount of extruded resin at the intersections so that the web-like deformation can be remarkably reduced and that the pressure loss of the feed-side channel can be reduced.

Particularly in the process of forming the net as shown in Part (A) of FIG. 1 by the fusion bonding method, it is effective to use a method in which the nozzle diameter for the well yarns differs from that for the warp yarns, and only the nozzle holes for the well yarns are rotated without rotating the nozzle holes for the warp yarns.

Materials selected in view of corrosion resistance, heat resistance, mechanical strength or the like (as described later) are a structural factor of the channel component. Besides the materials, the cross-section area of the channel is also an important structural factor. In the structural example as shown in Part (A) of FIG. 1, examples of the structural factor include the diameter of the warp yarn 1, the diameter of the weft yarn 2, the thickness 3 depending on the diameters, the warp spacing 4, the weft spacing 5, and the crossing angle 6. In view of mechanical strength, for example, the diameters of the warp and well yarns 1 and 2 may preferably be as large as possible. However, such large diameters lead to a reduction in the cross-section area of the channel and to an increase in the pressure loss and thus are not preferred. In view of strength, small crossing angles are preferred, because such small angles provide a large bonded area between the warp and well yarns 1 and 2. However, such small angles can lead to a reduction in the warp spacing 4 or in the cross-section area of the channel and to an increase in the pressure loss and thus are not preferred.

The inventors have selected these factors to form a channel that is optimum for a reduction in the pressure loss of the channel or for the prevention of inhibition or blockage of the flow and investigated the effect of the detailed structure and state of the intersections of the warp and weft yarns 1 and 2. As a result, the inventors have found that the fusion bonding method is optimum for allowing smooth flow without web-like deformation or the like.

Specifically, while the intersections of the net produced by the conventional method such as the shear method are deformed into a web-like form, such a deformation is remarkably less in the product formed by the fusion bonding method according to the invention than in the product formed by the shear method. Advantageously, the product formed by the fusion bonding method have a relatively smooth surface as compared to the surface of any other product such as the product formed by the shear method, so that damage to the membrane by contact with or wrapping and pressing onto the membrane surface can be lessened in the process of assembling the element. Such an advantage is very useful in forming the channel component, and the product formed by the fusion bonding method according to the invention can form a new excellent spiral separation membrane element even with a similar structure to that of the conventional product.

Particularly in the ladder type channel component, the weft yarns 2 to be brought into contact with the flow is made longer in many cases, and thus such an advantage of the product formed by the fusion bonding method can be fully utilized so that the superiority of the ladder type channel component itself and the advantage of the product formed by the fusion bonding method can synergistically be utilized.

While any material may be used to form the raw water-side channel component of the feed-side channel, the material is selected in view of corrosion resistance, heat resistance, mechanical strength or the like as mentioned above. Examples of such a material include polypropylene and polyethylene.

In order to reduce the pressure loss for feed fluid flow, the weft yarns crossing the direction of feed fluid flow may be made relatively thin as shown in Part (B) of FIG. 1 so that the cross-section area of the feed fluid channel can be made relatively large. Such a structure is effective against the inhibition or blockage of the flow in the feed-side channel and can reduce the pressure loss of the channel.

Specifically, the conventional ladder type channel component is composed of weft and warp yarns with substantially the same diameter, and its actual cross-sectional channel area is less than half of the cross-section area of the raw water side of the feed-side channel. This applies to the case of the rhombic type channel component. In the channel component according to the invention, the ratio of the diameter of the weft yarn to that of the warp yarn (for the ladder type) or the ratio of the diameter of the yarn in one direction to that in the other direction (for the rhombic type) may be set low so that the cross-section area of the channel can be set large and that the pressure loss can be smaller than that of the conventional product. Specifically, the inventors have found that the ratio of the diameter of the warp yarn to that of the weft yarn (warp:weft) is properly from 4:1 to 2:1. Using such a structure in the product formed by the fusion bonding method according to the invention ensures remarkably little web-like deformation of intersections as compared with the conventional product formed by the shear method or the like, ensures the effect of the reduction in the ratio of the diameter of the weft to that of the warp, and produces a factor for a further reduction in flow resistance.

In addition to the increase in the cross-section area of the channel, the entire surface of the weft yarns 2 can be in contact with the flow according to the invention. Therefore, there can be produced an synergistic effect in which the surface smoothness of the product formed by the fusion bonding method or the function of lessening the damage to the membrane by contact with or wrapping and pressing onto the membrane surface in the process of assembling the element can be further enhanced by the reduction in the diameter of the weft yarns 2, so that there can be provided an excellent spiral separation membrane element with much less pressure loss of the feed-side channel.

Figure 2:
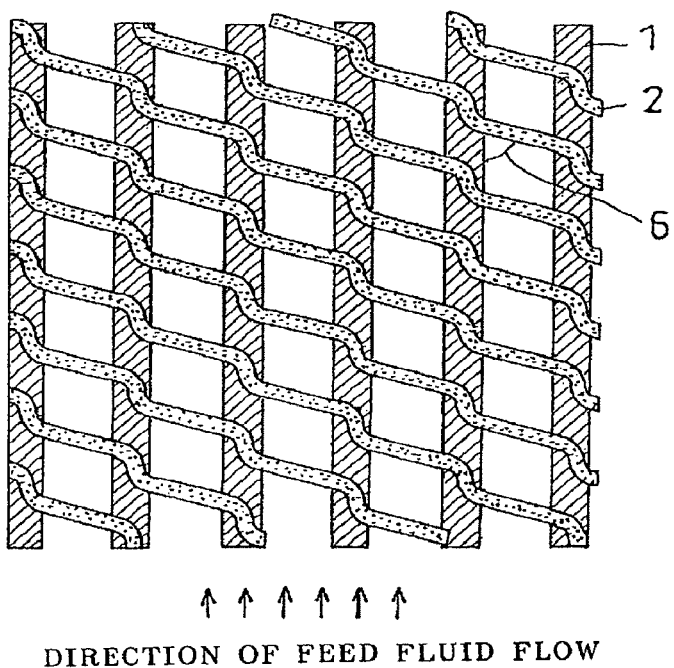
FIG. 2 is a schematic diagram showing a net type according to another embodiment of the invention (second structural example)

FIG. 2 shows the structure of a modified ladder type net channel component that forms another type of the spiral separation membrane element according to another embodiment of the invention (second structural example). In this structure, the warp yarn 1 is shifted in the direction of feed fluid flow such that the crossing angle 6 increases. In this structure, therefore, the warp spacing 4 is increased while the joint between the warp and weft yarns 1 and 2 are retained. This structure can increase the length of the joint between the warp and weft yarns 1 and 2 and ensure a sufficient strength of the net channel component and form an excellent net capable of having a relatively large cross-sectional channel area.

This structure also has a new excellent function in that the pressure loss can be controlled by adjusting the crossing angle 6 in the channel. Specifically, the warp spacing 4 and the cross-sectional channel area increase as the crossing angle 6 increases as described above, while the warp spacing 4 and the cross-sectional channel area decrease as the crossing angle 6 decreases. As the crossing angle 6 increases however, the weft spacing 5 decreases so that the pressure loss can increase. In this case, the pressure loss-reducing effect by the increase in the cross-sectional channel area can be restricted. Thus, the warp spacing 4, the weft spacing 5 and the crossing angle δ are properly selected so that a channel component with the desired pressure loss can be prepared.

Figure 3:
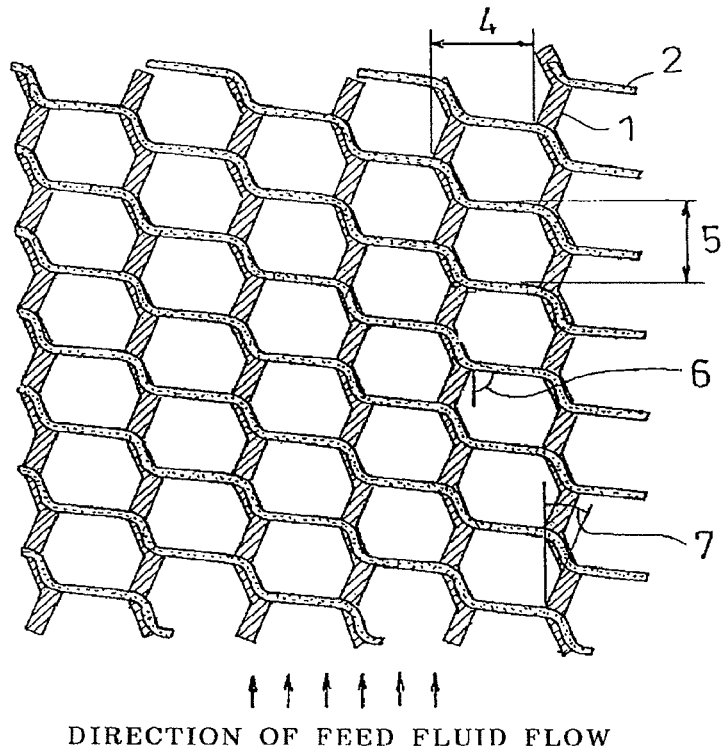
FIG. 3 is a schematic diagram showing a net type according to a third embodiment of the invention (third structural example)

FIG. 3 shows a third structural example according to the invention, which is a ladder type net channel component characterized in that the warp yarns are in the form of a meandering structure. Bringing the flow in the channel into a turbulent state is effective in preventing the inhibition or blockage of the flow in the channel and in reducing the pressure loss. The meandering structure of the warp yarns of the channel component can produce a larger turbulence effect than the conventional ladder or rhombic type channel component. Thus, there can be provided an excellent spiral separation membrane element with less pressure loss of the feed-side channel. Particularly in a case where the warp and the weft are different in diameter, this structure can enhance the turbulence of the flow and produce an increased turbulence effect so that the pressure loss of the feed-side channel can be further reduced.

In the conventional ladder type, the turbulence effect is produced by the weft, while in the rhombic type with no differentiation between warp and weft, the turbulence effect is produced by the two-directional crossing yarns. In the channel component according to the invention, the meandering structure of the warp yarns has easily produced a turbulence effect higher than that produced by linear warp yarns parallel to the water flow. In this structure of the channel component, a new factor, the meandering warp angle 7 as shown in FIG. 3, is added to the structural factors of the first structural example according to the invention, such as the diameter of the warp yarn 1, so that optimum channel conditions can be set to reduce the pressure loss of the channel or to prevent the inhibition or blockage of the flow. Like the case of the second structural example, the warp spacing 4, the weft spacing 5, the crossing angle 6, and the meandering warp angle 7 are properly selected so that a channel component with the desired pressure loss can be prepared.

Specifically, a study has been performed on a raw waterside channel component with a provisionally specified thickness of 26 mil, 28 mil or 34 mil for use in the feed-side channel. The result of the study indicates that the structural factor of the feed-side channel should preferably be set in the range as shown in Table 1 in order to produce the effect of reducing the pressure loss to ½ of the conventional product level.

TABLE 1

| Factors | Unit (mm) | 26 mil (0.64 to 0.68) | 28 mil (0.69 to 0.73) | 34 mil (0.84 to 0.88) |
| --- | --- | --- | --- | --- |
| Warp Diameter | mm | 0.44 to 0.49 | 0.47 to 0.53 | 0.57 to 0.65 |
| Weft Diameter | mm | 0.17 to 0.22 | 0.18 to 0.24 | 0.21 to 0.29 |
| Diameter Ratio of Warp to Weft | — | The ratio of warp diameter to thickness is 67 to 75% (warp:weft = 4:1 to 2:1). | | |
| Warp Spacing | mm | 3 to 5 | | |
| Weft Spacing | mm | 3 to 10 | | |
| Spacing Ratio of Warp to Weft | — | 2:1 to 1:1 | | |
| Weft Angle | ° | 45 to 90 | | |
| Meandering Warp Angle | ° | 0 to 30 | | |

With respect to the formation of the channel component, the above three structural examples according to the invention can be prepared by forming a specific channel component and then changing the degree of expansion or contraction in its width direction (a direction perpendicular to the direction of feed water flow) in the order of the first, second and third structural examples. Thus, these channel components have an excellent feature in that they can be very easily prepared depending on use conditions.

Figure 4:
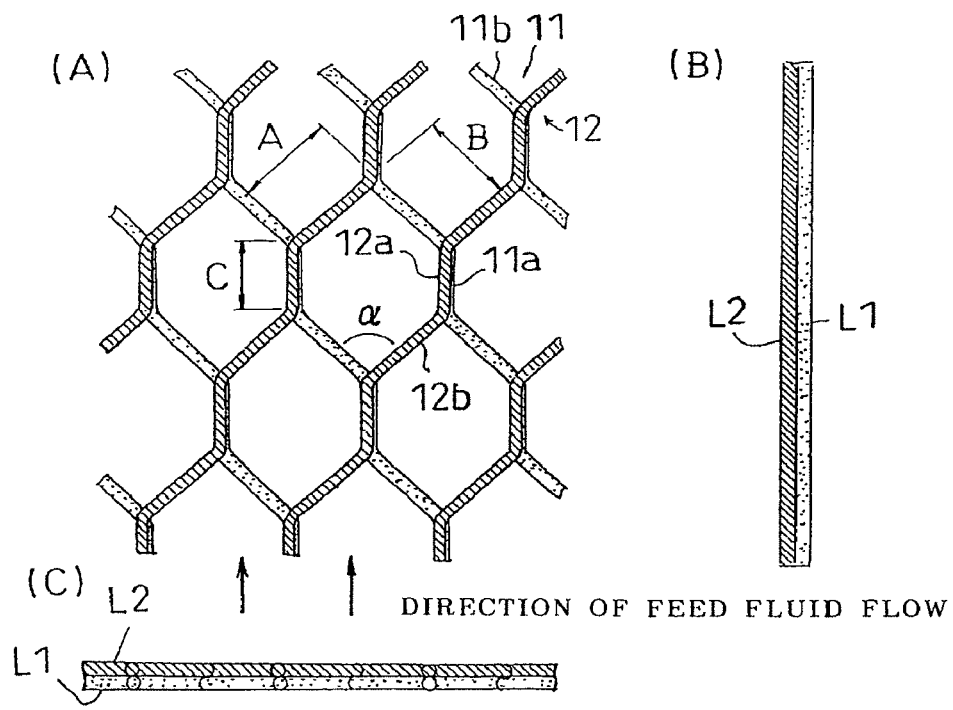
FIG. 4 is a schematic diagram showing a net type according to a fourth embodiment of the invention (fourth structural example)
Figure 5:
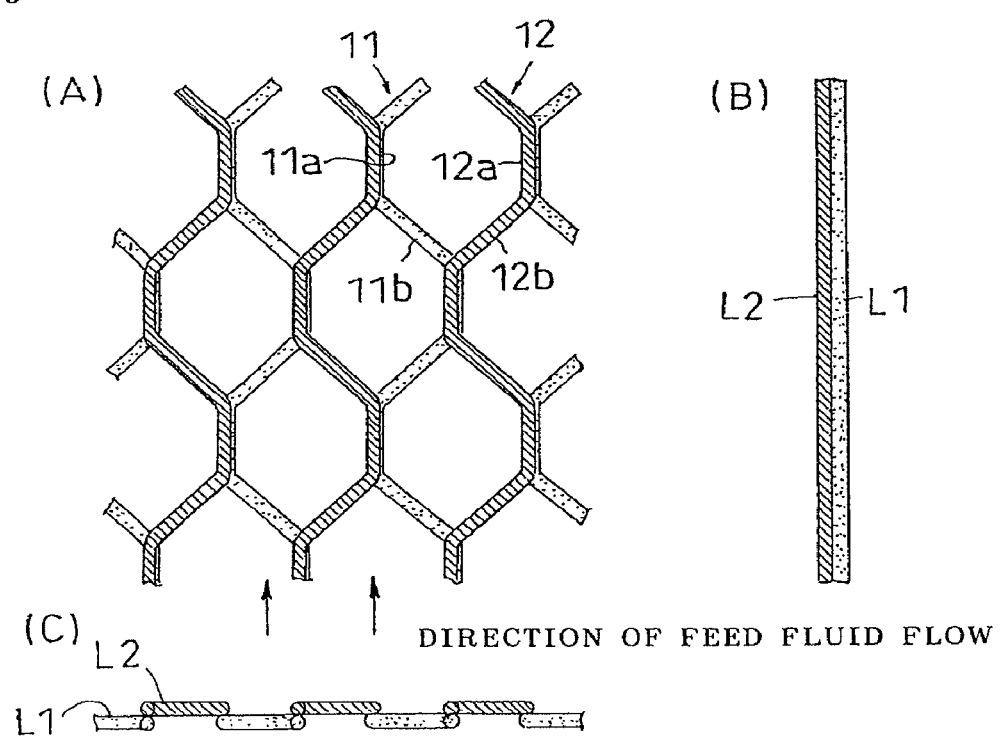
FIG. 5 is a schematic diagram showing another net type according to the fourth embodiment of the invention (fourth structural example)

FIGS. 4 and 5 show a fourth structural example according to the invention, in which Part (A) is a front view, Part (B) a side view, and Part (C) a bottom view. In this example, referring to FIGS. 4 and 5, the feed-side channel component has a two-layer structure including a first layer L1 composed of first yarns 11 and a second layer L2 composed of second yarns 12. In this structure, the first and second yarns 11 and 12 each have a parallel part 11a or 12a repeated and arranged substantially parallel to the direction of feed fluid flow and an oblique part 11b or 12b repeated and arranged in a direction oblique to the direction of feed fluid flow. In addition, the parallel part 11a of the first yarn 11 and the parallel part 12a of the second yarn 12 are fused and bonded to form a hexagonal plane unit.

In the fourth structural example as shown in FIG. 4, the respective oblique parts 11b and 12b of the first and second yarns 11 and 12 are inclined in the same direction. In the fourth structural example as shown in FIG. 5, the respective oblique parts 11b and 12b of the first and second yarns 11 and 12 are inclined in opposite directions. In the structure as shown in FIG. 5, the first and second yarns 11 and 12 are each arranged in a meandering manner along the direction of feed fluid flow so that the pressure loss of the feed-side channel can be further reduced.

In the process of forming the net as shown in FIG. 4 by the fusion bonding method, nozzle holes for the first yarns 11 and nozzle holes for the second yarns 12 may be intermittently rotated in opposite directions by performing a control in such a manner that the rotation of both nozzles is stopped only when the parallel parts 11a and 12a are extruded. In such a process, the extruded parallel parts 11a and 12a are fused and bonded to each other.

The process of forming the net as shown in FIG. 5 by the fusion bonding method may include the steps of extruding the oblique parts 11b and 12b while rotating both nozzle holes in opposite directions, extruding the parallel parts 11a and 12a while stopping the rotation of both nozzle holes, extruding next oblique parts 11b and 12b while rotating each of the nozzle holes in a direction opposite to the direction for the previous extrusion of the oblique parts 11b and 12b, then stopping the rotation of both nozzle holes, and repeating the above steps.

In this structural example, the intersections of the first and second yarns 11 and 12 are preferably 0.5 to 1.0 mm in thickness. The first and second yarns 11 and 12 are also preferably 0.15 to 0.5 mm in diameter. Preferably, the hexagonal plane unit has an apex angle α of 60° to 120°, an oblique side length A or B (that is the length of the oblique part 11b or 12b) of 2 to 5 mm, and a parallel part 11a or 12a length of 1 to 5 mm.

Figure 6:
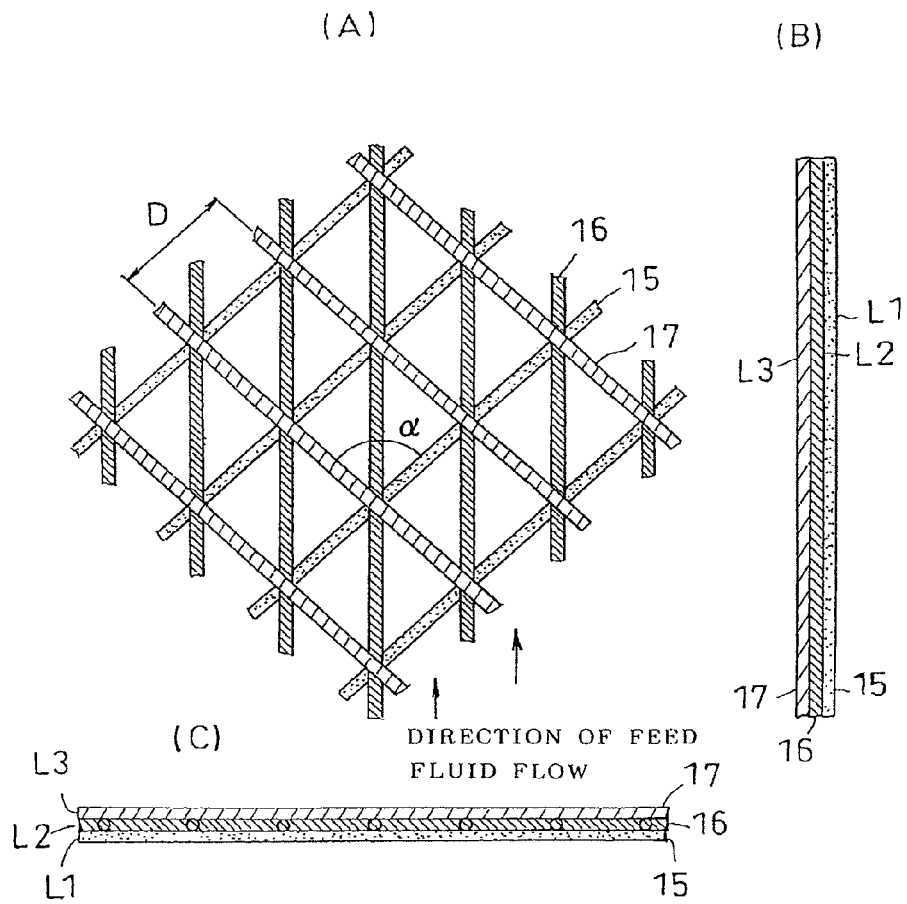
FIG. 6 is a schematic diagram showing a net type according to a fifth embodiment of the invention (fifth structural example)

FIG. 6 shows a fifth structural example according to the invention, in which Part (A) is a front view, Part (B) a side view, and Part (C) a bottom view. Referring to FIG. 6, this example has a three-layer structure including first, second and third layers L1, L2 and L3. Each layer is composed of warp yarns 16 arranged substantially parallel to the direction of feed fluid flow, oblique yarns 15 arranged in a direction oblique to the direction of feed fluid flow, and reverse oblique yarns 17 arranged in a direction that is reversely oblique to the direction of feed fluid flow with respect to the direction of the oblique yarns 15.

In the process of forming the net as shown in FIG. 6 by the fusion bonding method, the warp yarn 16, the oblique yarn 15 and the reverse oblique yarn 17 may be fused and bonded to one another to form intersections with the nozzle hole for the warp yarn 16 not rotating and with the nozzle holes for the oblique yarn 15 and the reverse oblique yarn 17 rotating in opposite directions.

The warp yarns 16, the oblique yarns 15 and the reverse oblique yarns 17 may be stacked in any order. Particularly, if the second layer L2 is composed of the warp yarns 16, the flow resistance can be low in the intermediate layer so that the pressure loss of the feed-side channel can be further reduced. In this case, concentration polarization can also be effectively suppressed in the vicinity of the membrane surface by a turbulence effect, because the oblique yarns 15 and the reverse oblique yarns 17 are in contact with the membrane surface.

The intersection of the first layer L1 and the second layer L2 may not coincide with that of the second layer L2 and the third layer L3. In terms of improving the morphological stability of the feed-side channel component, both intersections preferably coincide with each other.

In the fifth structural example, the intersections of the warp yarns 16, the oblique yarns 15 and the reverse oblique yarns 17 are preferably 0.5 to 1.0 mm in thickness. The warp yarns 16, the oblique yarns 15 and the reverse oblique yarns 17 are also preferably 0.1 to 0.5 mm in diameter. The plane unit form preferably has an oblique side length D of 2 to 5 mm. The angle α between the oblique yarn 15 and the reverse oblique yarn 17 is preferably from 60° to 120°.

The diameters of the warp yarn 16, the oblique yarn 15 and the reverse oblique yarn 17 may be the same or different. If the warp yarns 16 forming the second layer L2 are relatively thick, the pressure loss of the feed-side channel can be further reduced. In contrast, if the warp yarns 16 forming the second layer L2 are relatively thin, concentration polarization can be effectively suppressed in the vicinity of the membrane surface by a turbulence effect.

EXAMPLES

The structure and effects of the invention are specifically described with reference to the examples and the like below. It will be understood that the examples do not limit the scope of the invention.

Example 1/Comparative Example 1

Figure 7:
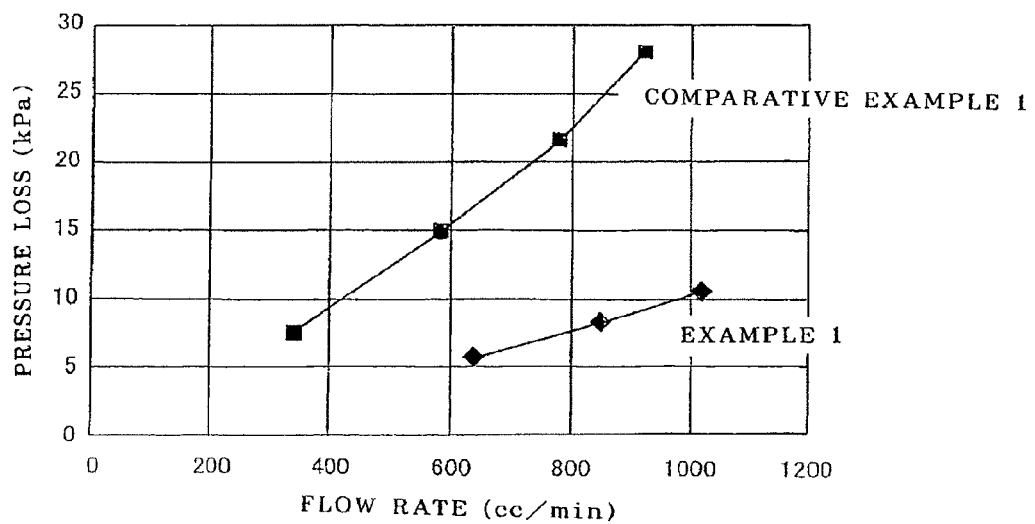
FIG. 7 is a schematic diagram illustrating the relationship between the flow rate of feed fluid and the pressure loss in Example 1 according to the invention.

The feed-side channel component as shown in Table 2 was placed in a parallel plate cell (C10-T, 35 mm in channel width, 135 mm in channel length). FIG. 7 shows the flow rate and the pressure loss at the time when purified water was allowed to flow into the channel component. The nets of Example 1 and Comparative Example 1 differ in the forming method and in the weft diameter, while the other specifications of the nets are the same. Nevertheless, the pressure loss in Example 1 was about ⅓ of that in Comparative Example 1.

TABLE 2

| Factors | Unit | Example 1 | Comparative Example 1 |
|---|---|---|---|
| Forming Method | — | Fusion Bonding | Shear Method |
| Net Type | — | Ladder Type | Ladder Type |
| Overall Thickness | mm | 0.71 | 0.71 |
| Weft Diameter | mm | 0.18 | 0.4 |
| Warp Spacing | mm | 3.4 | 3.5 |
| Weft Spacing | mm | 3.9 | 4.1 |
| Crossing Angle | ° | 48 | 48 |
| Meandering Warp Angle | ° | 0 | 0 |

Example 2/Comparative Example 2

Figure 8:
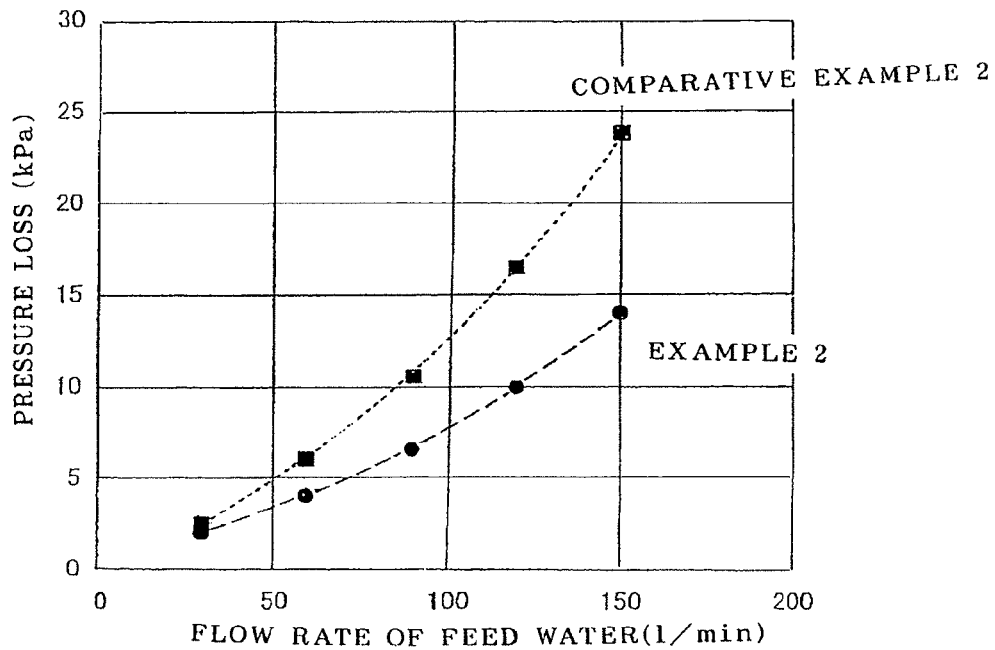
FIG. 8 is a schematic diagram illustrating the relationship between the flow rate of feed fluid and the pressure loss in Example 2 according to the invention.

A 23.2 m² spiral element was prepared using the feed-side channel component as shown in Table 3 and then loaded in a pressure vessel. FIG. 8 shows the flow rate and the pressure loss at the time when purified water was allowed to flow into the element loaded in the pressure vessel. The pressure loss in Example 2 was at most about ⅔ of that in Comparative Example 2.

TABLE 3

| Factors | Unit | Example 2 | Comparative Example 2 |
|---|---|---|---|
| Forming Method | — | Fusion Bonding | Shear Method |
| Net Type | — | Ladder Type | Rhombic Type |
| Overall Thickness | mm | 0.85 | 0.86 |
| Weft Diameter | mm | 0.24 | 0.46 |
| Warp Spacing | mm | 4.0 | 3.2 |
| Weft Spacing | mm | 3.6 | 3.2 |
| Crossing Angle | ° | 60 | 89 |
| Meandering Warp Angle | ° | 25 | — |

The performance of each of the spiral elements of Example 2 and Comparative Example 2 was examined with respect to NaCl. As a result, it has been demonstrated that the blocking performance of Example 2 is not lower than that of Comparative Example 2 and that a turbulence effect is sufficiently obtained to maintain the concentration polarization in Example 2, as shown in Table 4.

TABLE 4

| Items | Unit | Example 2 | Comparative Example 2 |
|---|---|---|---|
| NaCl Blocking Performance | % | 99.46 | 99.35 |
| Water Permeable Flow | m³/d | 35.53 | 35.48 |

Example 3/Comparative Example 3

Figure 9:
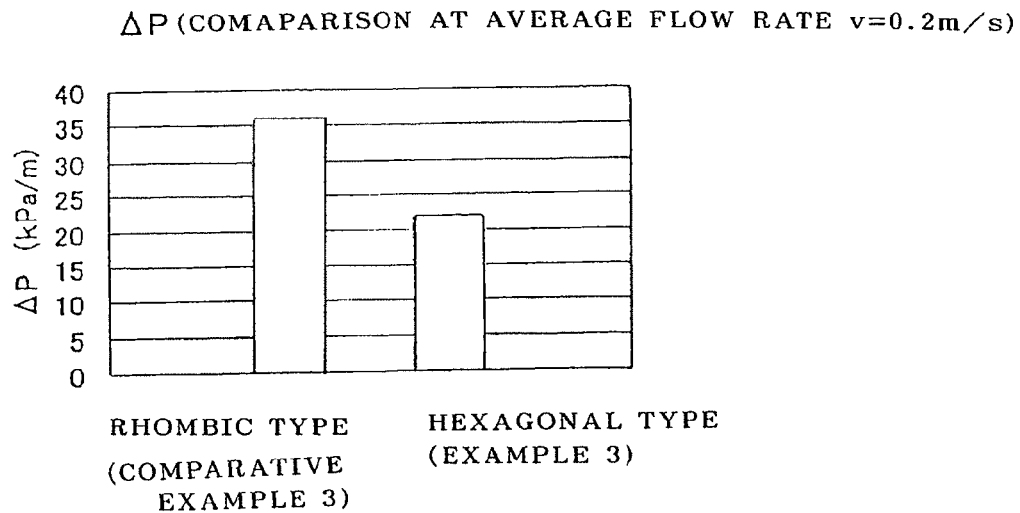
FIG. 9 is a schematic diagram showing a comparison between pressure losses in Example 3 according to the invention.

The feed-side channel component as shown in Table 5 was placed in a parallel plate cell (C10-T, 35 mm in channel width, 135 mm in channel length). FIG. 9 shows the pressure loss at the time when purified water was allowed to flow into the channel component at an average flow rate of 0.2 m/second. The nets of Example 3 and Comparative Example 3 differ in the forming method and in the plane unit form, while the other specifications of the nets are the same. Nevertheless, the pressure loss in Example 3 was about 60% of that in Comparative Example 3.

TABLE 5

| Items | Unit | Example 3 | Comparative Example 3 |
|---|---|---|---|
| Forming Method | — | Fusion Bonding | Fusion Bonding |
| Net Type | — | Hexagonal Type (FIG. 4) | Rhombic Type |
| Overall Thickness | mm | 0.71 | 0.71 |
| Yarn Diameter | mm | 0.36 | 0.36 |
| Yarn Spacing | mm | — | 3 |
| Size A or B | mm | 3 | — |
| Size C | mm | 2 | — |
| Apex Angle | ° | 90 | 90 |

Example 4/Comparative Example 4

Figure 10:
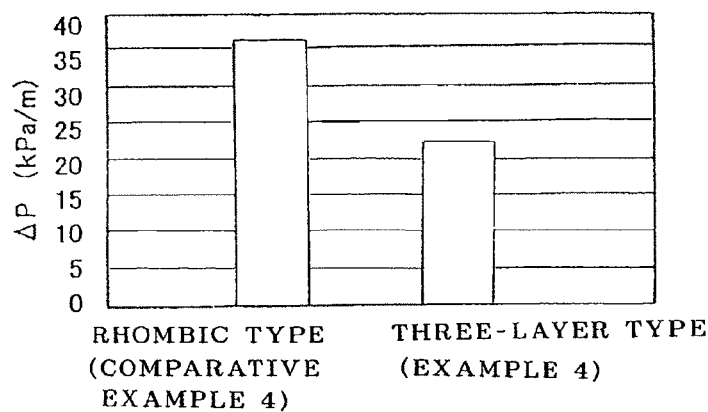
FIG. 10 is a schematic diagram showing a comparison between pressure losses in Example 4 according to the invention.
Figure 11:
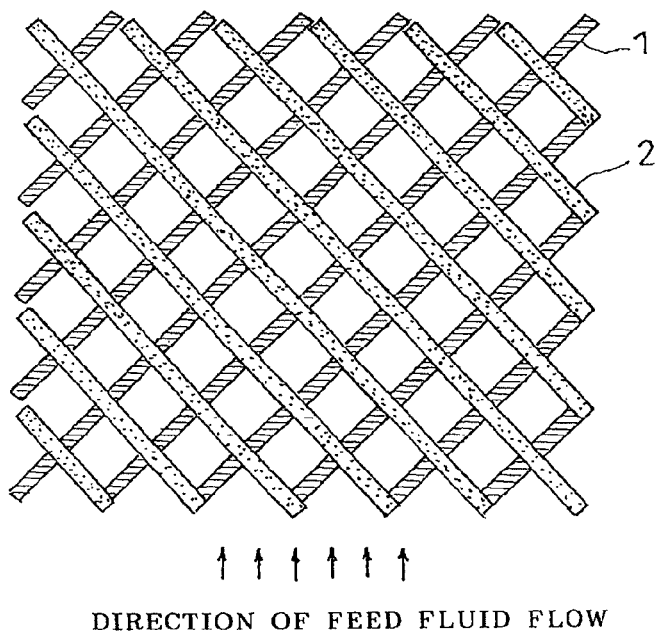
FIG. 11 is a schematic diagram showing a rhombic type net in a conventional mode.

The feed-side channel component as shown in Table 6 was placed in a parallel plate cell (C10-T, 35 mm in channel width, 135 mm in channel length). FIG. 10 shows the pressure loss at the time when purified water was allowed to flow into the channel component at an average flow rate of 0.2 m/second. The nets of Example 4 and Comparative Example 4 differ in the forming method and in the plane unit form, while the other specifications of the nets are the same. Nevertheless, the pressure loss in Example 4 was about 60% of that in Comparative Example 4.

TABLE 6

| Items | Unit | Example 4 | Comparative Example 4 |
|---|---|---|---|
| Forming Method | — | Fusion Bonding | Fusion Bonding |
| Net Type | — | Three-Layer Type | Rhombic Type |
| Overall Thickness | mm | 0.71 | 0.71 |
| Yarn Diameter | mm | 0.25 | 0.36 |
| Size D | mm | 3 | 3 |
| Apex Angle | ° | 90 | 90 |

INDUSTRIAL APPLICABILITY

While the feed-side channel component may be used in any application, it is effectively used in separation membrane elements or in low pressure elements to generally treat suspended matter-containing waste water (raw water) or the like.

The invention claimed is:

1. A spiral separation membrane element, comprising a separation membrane, a feed-side channel component, a permeation-side channel component, and a perforated hollow core tube around which the separation membrane, the feed-side channel component and the permeation-side channel component are wrapped, wherein
the feed-side channel component has a three-layer structure that includes a first layer, a second layer and a third layer, the feed-side channel component comprising:
warp yarns substantially parallel to the direction of feed fluid flow;
oblique yarns in a direction oblique to the direction of feed fluid flow; and
reverse oblique yarns in a direction that is reversely oblique to the direction of feed fluid flow with respect to the direction of the oblique yarns.

2. The spiral separation membrane element according to claim 1, wherein the second layer is interposed between the first layer and the third layer, and the second layer is composed of the warp yarns.

3. The spiral separation membrane element according to claim 1, wherein the feed-side channel component includes a plurality of intersections between each of the warp yarns, the oblique yarns and the reverse oblique yarns, wherein at each intersection, the warp yarns, the oblique yarns and the reverse oblique yarns overlap.

4. The spiral separation membrane element according to claim 3, wherein the intersections have a thickness of 0.5 to 1.0 mm.

5. The spiral separation membrane element according to claim 1, wherein the warp yarns, the oblique yarns and the reverse oblique yarns each independently have a diameter of 0.1 to 0.5 mm.

6. The spiral separation membrane element according to claim 1, wherein each of the oblique yarns are 2 to 5 mm apart.

7. The spiral separation membrane element according to claim 1, wherein the warp yarns are thicker than the oblique yarns and the reverse oblique yarns.

8. The spiral separation membrane element according to claim 1, wherein the warp yarns are thinner than the oblique yarns and the reverse oblique yarns.

9. The spiral separation membrane element according to claim 1, wherein the oblique yarns and the reverse oblique yarns intersect at an angle α from 60° to 120°.

10. The spiral separation membrane element according to claim 9, wherein the angle α is 90°.

11. The spiral separation membrane element according to claim 9, wherein the warp yarns bisect the angle α.

12. The spiral separation membrane element according to claim 1, wherein the oblique yarns are substantially parallel to each other, and the reverse oblique yarns are substantially parallel to each other.

* * * * *

UNITED STATES PATENT AND TRADEMARK OFFICE
CERTIFICATE OF CORRECTION

PATENT NO.         : 8,361,318 B2                                           Page 1 of 1
APPLICATION NO.    : 12/642653
DATED              : January 29, 2013
INVENTOR(S)        : Shinichi Chikura et al.

It is certified that error appears in the above-identified patent and that said Letters Patent is hereby corrected as shown below:

In the Drawings
In Sheet 5 of 6 (FIG. 9), Line 1, Change "(COMAPARISON" to --(COMPARISON--.

In the Specification
In Column 1, Line 47, Change "well" to --weft--.
In Column 1, Line 48, Change "well" to --weft--.
In Column 5, Line 30, Change "well" to --weft--.
In Column 5, Line 35, Change "well" to --weft--.
In Column 5, Line 36, Change "well" to --weft--.
In Column 5, Line 40, Change "well" to --weft--.
In Column 5, Line 47, Change "well" to --weft--.
In Column 5, Line 49, Change "well" to --weft--.
In Column 5, Line 61, Change "well" to --weft--.
In Column 5, Line 66, Change "well" to --weft--.
In Column 7, Line 39, Change "δ" to --6--.

Signed and Sealed this
Fourth Day of February, 2014

Michelle K. Lee
*Deputy Director of the United States Patent and Trademark Office*